United States Patent [19]

Gross et al.

[11] 4,379,008
[45] Apr. 5, 1983

[54] METHOD AND APPARATUS FOR SEALING CARDBOARD CONTAINERS

[75] Inventors: Helmut Gross; Hermann Hauck, both of Hochheim, Fed. Rep. of Germany

[73] Assignee: AB Akerlund & Rausing, Sweden

[21] Appl. No.: 201,402

[22] PCT Filed: Mar. 3, 1980

[86] PCT No.: PCT/SE80/00060

§ 371 Date: Nov. 3, 1980

§ 102(e) Date: Oct. 27, 1980

[87] PCT Pub. No.: WO80/01789

PCT Pub. Date: Sep. 4, 1980

[30] Foreign Application Priority Data

Mar. 3, 1979 [DE] Fed. Rep. of Germany ....... 2908397

[51] Int. Cl.³ .............................................. B29C 27/00
[52] U.S. Cl. ........................................ 156/69; 53/478;
156/182; 156/224; 156/247; 156/290; 156/292;
156/295; 156/308.4; 156/309.9; 156/310;
156/320; 156/324.4; 156/344; 229/43; 229/48
T; 426/113; 426/394; 493/129
[58] Field of Search ................. 426/113, 394; 53/478;
493/129; 229/43, 48 T; 156/182, 344, 224,
308.4, 227, 309.9, 247, 310, 290, 320, 292, 324.4,
295, 69; 525/919; 428/35

[56] References Cited

U.S. PATENT DOCUMENTS 3,264,272 8/1966 Rees ..................................... 156/332
3,364,091 1/1968 Conti ................................... 156/182
3,488,201 1/1970 Pizarro ................................. 229/43
3,508,376 4/1970 Bemiss ................................ 156/292
3,512,332 5/1970 Klein .................................. 156/224
3,645,825 2/1972 Gaunt et al. .......................... 53/478
3,673,041 6/1972 Schulz et al. ..................... 156/308.4
3,923,578 12/1975 Hair .................................... 156/290

FOREIGN PATENT DOCUMENTS 614140 2/1961 Canada .............................. 229/48 T

OTHER PUBLICATIONS

Hawley (editor), The Condensed Chemical Dictionary, 9th Edition, pp. 471 & 831.

Primary Examiner—John J. Gallagher
Attorney, Agent, or Firm—Lerner, David, Littenberg & Samuel

[57] ABSTRACT

A method and apparatus for sealing plastic or synthetic coated sealing surfaces of cardboard containers to each other is disclosed. One feature of the invention resides in preheating (by 15) of at least one (48) of the plastic or synthetic layers and then sealing (station 16) by the simultaneous application of heat and pressure. Another feature of the invention resides in the fact that the pressure is applied at spaced intervals (by 40) and in such a manner that one (47) of the plastic or synthetic sealing layers remains with the top of the box upon removal thereof. A container sealed in such a manner is also taught.

3 Claims, 11 Drawing Figures

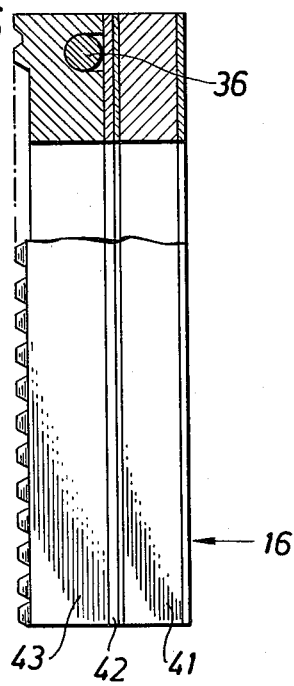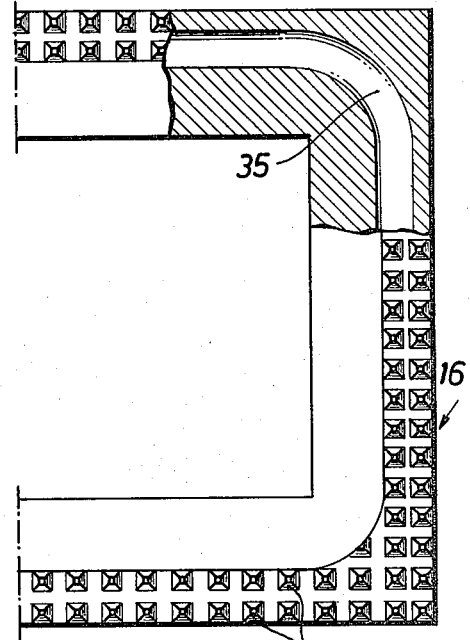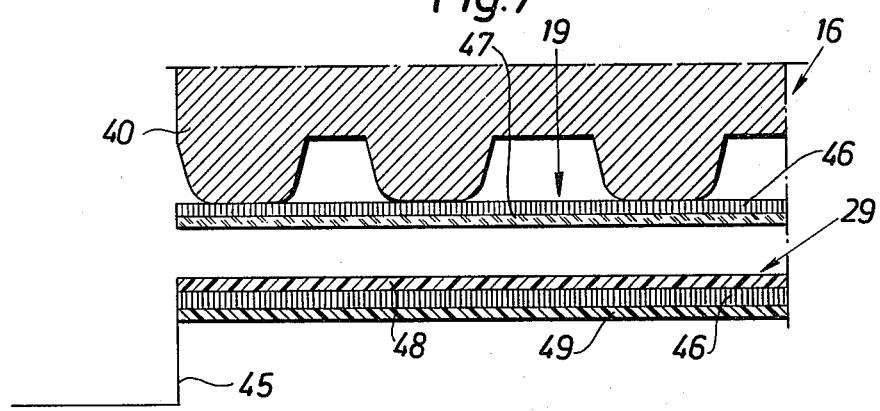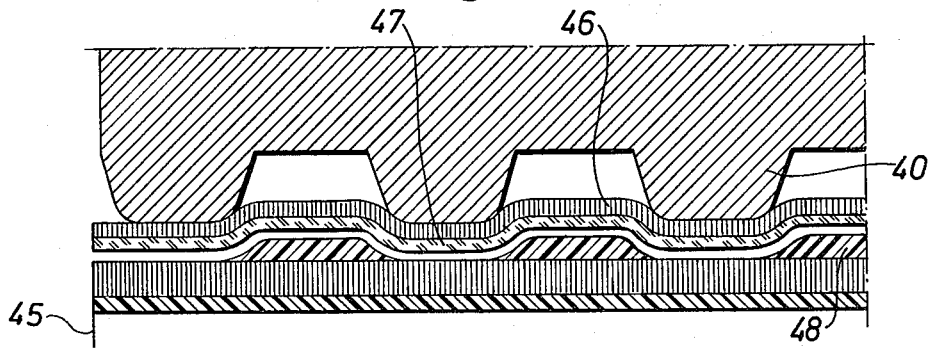

METHOD AND APPARATUS FOR SEALING CARDBOARD CONTAINERS

This invention relates to a method and apparatus for sealing cardboard containers, and particularly to a method and apparatus for sealing cardboard containers including synthetic heat sealable coatings, and particularly to such containers for storing prepared foods.

BACKGROUND OF THE INVENTION

The invention is described using the example of a bowl-shaped folded box, which is filled with powdered prepared foods, especially baked goods, and which is then closed with a lid. Such a bowl-shaped folded box is known, for example, from German Offenlegungsschrift no. 28 19 708. The packaging bowl shown there consists of cardboard as the base or carrier material. The cardboard is coated with polyethylene, polypropylene, or a similar material, and covered with an appealing colored print on the outside. The package includes a layer of aluminum foil on the inside. Such baking bowls are sold to the consumer filled and sealed with a lid, and the consumer only has to tear off the lid, and place the opened baking bowl into a conventional oven. After baking, the bowl-shaped box can be opened and unfolded so that the finished cake or the like can easily be transferred to other dishes.

The difficulty concerning the known bowl-shaped box is that the materials used must be kept at a rather high temperature for a length of time without a detrimental effect on the food. For example, there are prepared mixes for baked goods which require heating for 40 to 45 minutes at a temperature of 175° C. As a result, the materials from which the folded box is produced must be resistant to such temperatures for the amount of time required. Other prepared foods must be brought to a temperature of approximately 150° C. in an automated convection oven.

Sealing of the baking bowls has been a special source of significant difficulties, especially since the layer of aluminum foil excludes the possibility of heating by microwave, and for this reason the use of different synthetic heat sealable materials and lacquers as the material for coating the cardboard have been tried. The temperature limit finally set for the cooking or baking process is determined by the synthetics used. For example, it has been determined that this temperature limit lies in the range between 100° and 105° C. for polyethylene; between 145° and 150° C. for polypropylene; and in the range between 220° and 225° C. for polyester (PBTP or PETP). It is precisely these polyesters that must be regarded as synthetics that are difficult to heat seal. On the one hand there is the requirement that the package in each case should be leak-proof, and, on the other hand, intensive heat sealing must be possible.

If we want to heat seal two parts coated with synthetic materials, then one critical property is the short solidification temperature interval, i.e. a short temperature interval between the liquid and the solid state of the synthetic. When using polyester, this interval becomes so small that a good heat seal is difficult to obtain.

If too much heat is applied such that too much heat penetrates through the cardboard carrier material to the synthetic or lacquer coating, then there is often the danger of burning, this is, brown spots occur, which detrimentally affect the appearance of the finished, closed packaging. Also, the printer's ink could be damaged by being heated too much.

It is known in principle that sheets of cardboard carrier material coated with synthetic resin can be combined with one another by being welded or sealed by constant heat baking, by pressing a so-called upper heater against a counter-pressure plate, and that using this, the temperature also penetrates through the carrier material to the coating which is to be liquified. In other welding techniques, the use of a lower heater is known, and in still other methods, the use of a lower heater and an upper heater is known. Heating by application of hot air and subsequent pressing by means of cold cheeks has also proven practical for polyester.

SUMMARY OF THE INVENTION

The main object of the invention is to provide a process of the type mentioned initially, as well as a device for carrying out this process, with which it is possible to coat open boxes, which have an outer edge, with such a material, and also to coat the lid in such a practical manner, that a tight and solid welded seal is created, without damage to prepared surfaces, particularly without burning, and that this seal can be easily broken, and gives off no harmful substances when the food is heated to the required temperature.

This object is met according to the invention by having the synthetic materials of the lid and box be difficult to seal materials of the types mentioned above, by preheating the upper surface of the upper edge of the box, which is coated with a synthetic material, and by then pressing the lid onto the upper edge of the box which is also coated with a synthetic material while applying additional heat. The so-called difficult to seal or difficult to heat seal synthetics have proven to be a good solution to the above task under certain conditions, because a tight seal is guaranteed by preheating on the one hand and combining the lid and the box under pressure while applying heat on the other hand.

It is possible to avoid extreme heating of the surfaces by upper or lower heat by means of pressure plates. By setting the temperature in the preheating station, the heat application in the sealing station can be kept sufficiently low so that the folded box can be sealed tightly and leak-proof and yet the lid can be torn off by the consumer without using too much force, and the prepared foods are not detrimentally affected during heat sealing. The application of heat in the preheating station is adjusted so that the synthetic sealing material is brought to or approximately to its softening point but below its melting point.

According to the invention, preferably preheating is achieved by means of a hot air shower. In the preferred embodiment, the hot air shower is used to heat the upper edge of the containers. Still further, the sealing pressure is applied in spots at spaced intervals.

With the process and apparatus according to the invention, unexpectedly, it is possible to use polyester-polyester because even here the required conditions can be maintained.

Experiments have shown especially good results with the combination of polyester-Surlyn (a registered trademark E. I. Du Pont De Nemours & Company). Surlyn an ionomer resin has a good affinity for many coating materials. Its adhesion characteristics are particularly advantageous for use with polyester, and the sealing process can be effected for the first time by the measures according to the invention, while maintaining the desired conditions, although the pairing of polyester (on the bowl-shaped folded box) on the one hand and Surlyn (on the lid) on the other hand is difficult to seal.

According to the invention, a solution was found for the first time for the problem, that in the packaging for prepared foods that is under discussion here, that is packaging for foods which are finished by the consumer by heating in the packaging, it is possible to use Surlyn, although its melting point lies at 90° C. For the production and closing of the cardboard container according to the invention, the further condition must be fulfilled, that the packaged product does not come into contact with Surlyn after it is opened, when it is heated.

If the process according to the invention is used in the manner described above, then the plasticized or liquid polyester layer (e.g. PBTP) is pressed out of the areas where pressure is applied to surrounding areas, by the application of sealing pressure, while at the same time the cardboard of the lid, together with the Surlyn coating, is deformed. As already mentioned above, Surlyn has good bonding power, and then pressed down further, penetrates the areas of cardboard where the polyester has been removed, and combines there. In this manner, a package which is leak-proof, especially for powders, temperature resistant, and easy to open is created in an advantageous manner, and the appearance of the package does not suffer as a result of the sealing process. Also the last condition, that the finished product may not come into contact with Surlyn during its stay in the oven, is surprisingly fulfilled because when the consumer opens the closed cardboard container, he tears out some cardboard fibers together withthe lid that is coated with Surlyn, from the areas of adhesion on the upper edge of the box. After the lid is torn open, the Surlyn which is not heat-resistant at high temperatures (e.g. 175° C. during baking), adheres to the torn-off lid. The degree of anchoring between the Surlyn and the areas of cardboard from which the polyester has been removed by the sealing pressure which is applied only in spots, is easily adjusted by trial and error so that the packaging is not destroyed when the lid is torn off. While the extreme temperature of the Surlyn is 90° C., the temperature resistance of the polyester which remains on the upper edge of the box, and which is exposed to the baking process, lies at 225° C. Therefore, no effect on the prepared food is to be expected during final processing, because the lid which contains the non-heat-resistant Surlyn has already been torn off, thrown away, and is not exposed to the high temperature.

The device for carrying out the process, which was mentioned initially, is characterized by the fact that there is a hot air shower to preheat the surface of the upper edge of the box, located in front of the heat sealing station. By these means, the advantageous welding or sealing process described above is possible. In the preferred embodiment, the hot air shower is located above a heated lower frame, which supports the upper edge of the box, keeping it warm. By keeping the lower frame warm, enough supporting heat is applied from below to the flange, which is to be sealed, of the still open package, so that the synthetic layer, which has been preheated and softened does not partly re-solidify due to too great a heat loss.

In a further advantageous form of the invention, the hot air shower has a manifold block with a housing that is screwed on and adjustable, with hold-down clamps attached to the side of the housing that faces the lower frame. Blowing of the hot air can be carried out in a precisely defined direction, width, and flow-through amount, and these conditions can be adjusted by adjusting the setting of the exterior housing. Furthermore, it is advantageous if the upper edge of the folded box is pressed onto the lower frame by hold-down clamps when it is set up, and that these hold-down clamps press against the lower frame, e.g. at certain points, so that the adjustment of the exit slot for the hot air set at the manifold block is not possibly negated by the fact that the edge of the box is angled unevenly.

It is also practical according to the invention if an upper and a lower heater, each with a frame-type welding plate, are provided, and at least one weld plate has projections on the surface that lies across from the other weld plate. With these measures, heat-sealing or sealing by pressing at certain spots or points is possible. Of course "points" is not used to mean points in the geometric sense, but finite areas that are spaced at intervals. These are obtained, e.g., with projections in the shape of a truncated pyramid, which project up or down from one weld plate to the other, preferably at even intervals, if necessary at intervals that are approximately the same size as the pressure areas. For this, we can imagine a network of lower and raised areas, where the lower areas have no sealing pressure, and the raised areas are those which provide the sealing pressure.

BRIEF DESCRIPTION OF THE DRAWINGS

FIG. 5 shows the upper heater, partly as a side view and partly in cross-section, looking from above in FIG. 6;

FIG. 6 shows a top view of a profiled weld plate, in this case an upper heater;

FIGS. 7 to 10 show different steps of the process, schematically and in cut-aways, during sealing of the lid onto the upper edge of the folded box; and, FIG. 11 shows a partly torn off lid, which is partly still attached to the upper edge of the folded box, schematically and broken off in cross-section.

DETAILED DESCRIPTION OF INVENTION

Figure 1:
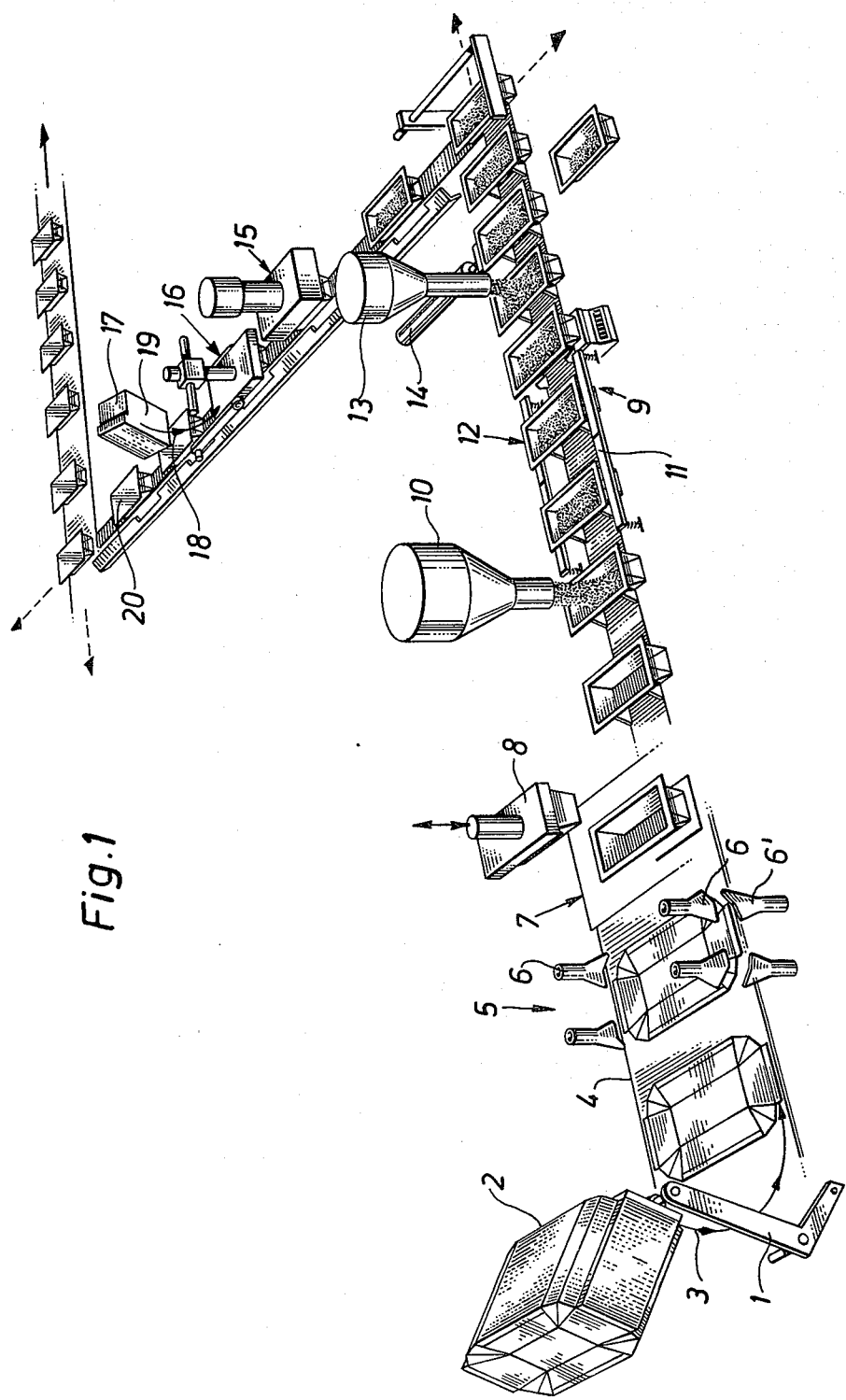
FIG. 1 is a schematic perspective view showing the entire set-up, from the production of the cardboard container, to filling, to closing and transport elsewhere.

The folded box, which is coated with a synthetic, and coated with polyester in our prototype, is produced, filled, and sealed with a lid according to FIG. 1, and the lids are coated with Surlyn, for example. Using the take-off device 1 which is represented only schematically, the lowest in a stack of blanks 2 is removed in the direction of the curved arrow 3 and placed on a feed mechanism 4 which is indicated only in part and schematically. In the station 5, activation of the sealing surfaces using the hot air jets 6 is carried out, so that the packaging bowl is shaped, i.e. folded and set up, in the station 7, using a press 8 which enters a die, where the press can be moved in the direction of the double-headed arrow. In the subsequent station, which is designated in total with the number 9, preliminary filling occurs by way of the first single funnel 10, shaking by means of a shaker 11, weighing in the area 12, fill-up using the fill-up funnel 13, and, if necessary, removal of the unfilled packaging bowls using the empty package removal device 14. The packaging bowl, which is now filled, is then moved to the left at an angle of 90°, in FIG. 1, and brought under the hot air shower 15, which is explained in more detail in FIGS. 2–4. In the station 16, the lid 19 which was removed from the bottom of the stack 17 in the direction of the curved arrow 18 is sealed on by pressure and heat using upper and/or lower heat. The sealed folded box which is shown at 20 is then transported off for further handling.

Figure 2:
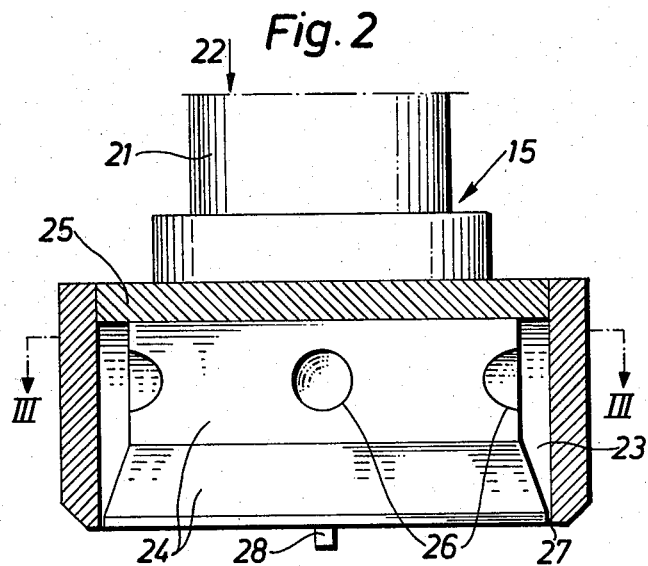
FIG. 2 shows the hot air shower in cross-section.
Figure 3:
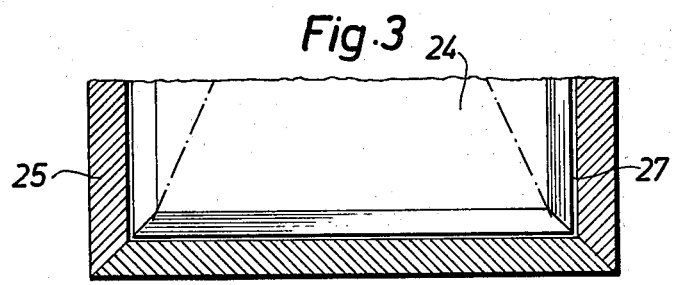
FIG. 3 shows a partial cross-section perpendicular to that shown in FIG. 2, along the line III—III in FIG. 2.
Figure 4:
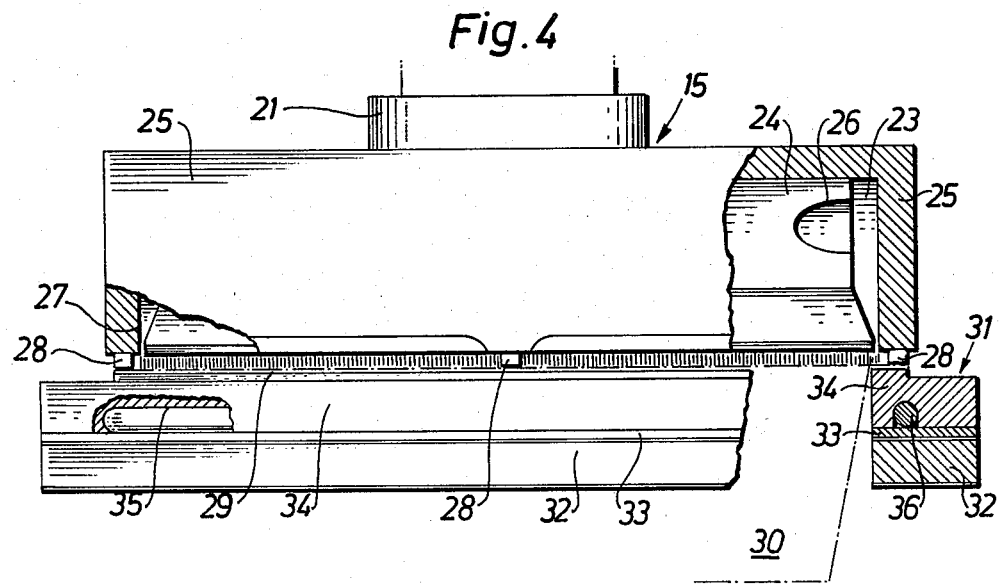
FIG. 4 shows the hot air shower, partly as a side view and partly as a cut-away, in operation, preheating the upper edge of the folded box.

The hot air shower 15, which is shown in more detail in FIGS. 2–4, is of particular interest according to the invention. In the air heater 21, which is shown only in part, heated air flows in the direction of the arrow 22 and passes into the manifold block 24. There is a pressure chamber 23 and an exterior housing 25.

The air flows from the air heater 21 through the manifold block 24 toward the exterior housing 25 and through outlet openings 26 into the pressure chamber 23, which narrows toward the bottom, as shown in FIG. 2. The narrowing at the bottom of the pressure chamber 23 creates an exit slot 27 for the hot air, the flow of which is indicated in FIG. 4 by lines under the manifold block, and this exit slot runs all around the pressure chamber, as shown in FIG. 3. In FIG. 4, we can also see the hold-down clamps or pins 28 attached to the lower edge of the exterior housing 25 which are used to adjustably mount the exterior housing 25 on and above the support frame 34.

The operation of the hot air shower is evident from FIG. 4, where the hot air is shown exiting from the exit slot 27, and impacting on the upper edge 29 of the folded box 30 all the way around, between the hold-down clamps 28. From below, this upper edge 29 is supported by the lower frame, designated in general as 31. This consists of a base plate 32, an insulation layer 33, and a heater resistor 36 which is located in the recess 35 of the support frame 34.

The station designated as 16 in FIG. 1 has the upper heater shown in FIGS. 5 and 6, among other things. Its projections 40, which have the shape of a truncated pyramid, are shown enlarged in FIGS. 7–10. Similar to the lower frame according to FIG. 4, the upper heater 16 is also built on a base plate 41, which is separated by an insulating layer 42, and holds the upper weld plate 43, which in turn has a heater resistor 36. In FIG. 6 we see the view of a profiled weld plate from below, where a cross-section with an opening, recess, or channel 35 is visible in the right upper part, broken off, and in this, as in the prototype according to FIG. 4, a heater resistor 36 is installed.

FIG. 7 shows the first step of the process, in which the upper edge 29 of the folded box 30 is shown on an unheated lower frame 45, shown in enlarged cross-section, and depicting the built-up layers. In the center we see the layer 46, shown with vertical hatched lines, composed of cardboard carrier material. Under the projections 40 of the upper heater 16, which are shaped like truncated pyramids, there is also a cardboard layer 46. This cardboard layer 46 is laminated or coated with a layer of Surlyn 47, and the two together comprise the lid 19. Between the lid 19 and the upper edge 29 of the folded box 30 there is a free space as shown in FIG. 7. The upper edge of the edge 29 is coated with the polyester layer 48 on the top and with the polyester layer 49 on the bottom.

If the upper heater 16 now impacts on the lower support frame 45, the ideal state which is shown in FIG. 8 is achieved. The cardboard layer 46 on the lid 19 has been deformed, and the Surlyn layer has deformed with it; this is caused by the spot sealing pressure contacts created by the truncated pyramid projections 40. This sealing pressure causes the polyester layer 48, which was preheated and plasticized or softened by the hot air shower earlier, to flow out of the areas under the projections 40 into the areas between them, where the polyester material is collected, while the areas under the projections 40 lose their polyester, and contain almost no polyester anymore.

Figure 9:
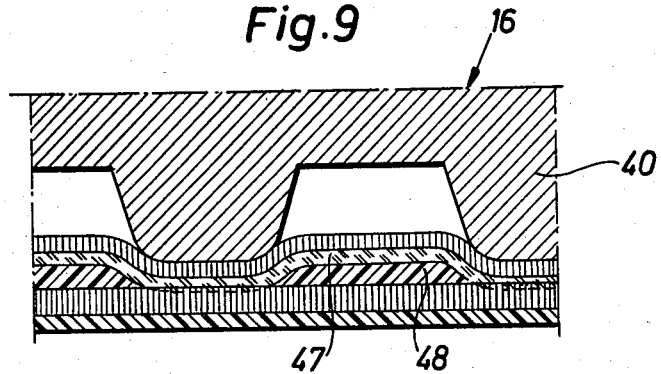
Figure 10:
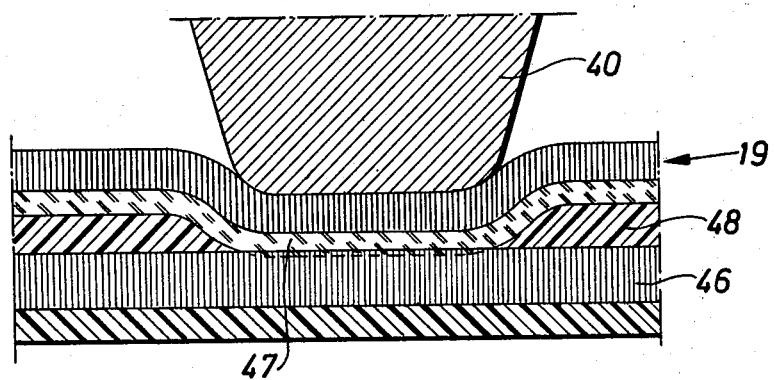

As the upper heater 16 continues to come down, the state shown in FIGS. 9 and 10 is achieved. We can see that the Surlyn layer 47 partially penetrates the cardboard material 46 in the areas under the projections 40, which are practically free of polyester 48, and creates a firm bond with it. This concludes the sealing process, and the folded box is closed in the desired manner, according to the invention. The sealing temperatures are below the melt points of the sealing materials and, normally, below the temperatures attained in the hot air shower.

Figure 11:
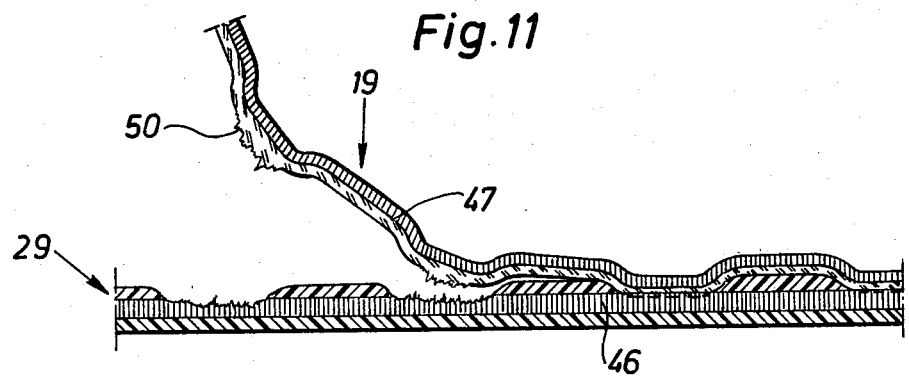

The consumer must tear off the lid 19 from the upper edge 29 of the folded box 30, as shown in FIG. 11, before he puts a baking bowl into the oven. This is carried out, causing the fibers of the cardboard layer 46 which can be seen in FIG. 11 at 50 to be torn out together with the lid 19; the surface of the cardboard layer had been under the projections 40 in these areas earlier. This achieves the purpose, that the entire Surlyn layer 47 actually adheres to the lid 19 and is completely separated from the folded box 30, so that there is no detrimental effect on the food during the baking process. As noted previously, the Surlyn stays with the lid because it is firmly bonded thereto along its entire surface and only bonded to the bottom at spaced spots of a size determined by trial and error such that removal of the lid carries substantially all of the Surlyn.

The present description has been by way of example only as it is intended that the scope of the invention be defined by the appended claims.

What we claim:

1. A method of sealing a container top to a container bottom in which the container top and container bottom are both made of cardboard, at least a sealing surface of the container top being coated with an ionomer resin and at least a sealing surface of the container bottom to be attached to the sealing surface of the container top being coated with a polyester resin, comprising the steps of preheating the sealing surface of the container bottom so that the polyester resin is brought to a softened state and thereafter sealing the container top to the container bottom while the polyester resin is still in its softened state by heating the sealing surfaces of the container top and the container bottom and simultaneously pressing the sealing surfaces of the container top and the container bottom together at spaced intervals so that the polyester resin is displaced away from preselected areas on the sealing surface of the container bottom which are pressed against the sealing surface of the container top, whereby the ionomer resin adheres to the sealing surface of the container bottom in the preselected areas thereon, the preselected areas being selected such that substantially all of the ionomer resin will remain with the container top upon separation of the container top from the container bottom.

2. A method according to claim 1, wherein the heat applied during the sealing step is at a lower temperature than the heat applied during the preheating step.

3. A method according to claim 1, wherein the preheating is accomplished with the use of hot air.

* * * * *